United States Patent [19]

Smith et al.

[11] Patent Number: 4,785,624

[45] Date of Patent: Nov. 22, 1988

[54] TURBINE ENGINE BLADE VARIABLE COOLING MEANS

[75] Inventors: Raymond Smith, Monclova; Quentin Z. Peregoy, Toledo; George E. Richardson, Sylvania, all of Ohio

[73] Assignee: Teledyne Industries, Inc., Los Angeles, Calif.

[21] Appl. No.: 68,131

[22] Filed: Jun. 30, 1987

[51] Int. Cl.$^4$ .............................................. F02C 7/12
[52] U.S. Cl. .................................. 60/39.75; 60/39.07; 60/39.83; 415/127; 137/625.31
[58] Field of Search ................. 60/39.83, 39.07, 39.29, 60/39.75; 415/150, 127, 116, 175; 137/625.31, 625.28; 251/345; 74/54

[56] References Cited

U.S. PATENT DOCUMENTS

| | | | |
|---|---|---|---|
| 3,074,432 | 1/1963 | Beale et al. | 137/625.28 |
| 3,127,909 | 4/1964 | Alamprese | 137/625.31 |
| 3,779,007 | 12/1973 | Lavash | 60/39.28 |
| 3,958,413 | 5/1976 | Cornelius et al. | 60/39.23 |
| 4,085,579 | 4/1978 | Holzapfel et al. | 60/39.04 |
| 4,304,093 | 12/1981 | Schulze | 60/39.07 |
| 4,344,282 | 8/1982 | Anders | 60/39.07 |
| 4,398,926 | 11/1982 | Smith | 60/39.83 |
| 4,416,111 | 11/1983 | Lenahan et al. | 60/39.29 |
| 4,462,204 | 7/1984 | Hull | 60/39.07 |
| 4,603,547 | 8/1986 | Pfefferle et al. | 60/39.02 |
| 4,688,986 | 8/1987 | Schucker | 415/150 |

Primary Examiner—Donald E. Stout
Attorney, Agent, or Firm—Gifford, Groh, VanOphem, Sheridan, Sprinkle and Dolgorukov

[57] ABSTRACT

A turbine engine, having a cooling passage diverting a part of the airflow from the turbine compressor for impingement upon the turbine blades, includes a concentric pair of apertured rings disposed in the passage for variably obstructing flow through the cooling passage between zero and a maximal value. One of the rings is fixed to the turbine housing, while the other of the rings is rotatable with respect to the first ring and the housing. The mobile ring can be rotated by a pressurized cylinder and piston assembly, or by a biasing device causing abutment of a stop on the second ring against an abutment surface on a cam. The cylinder and piston are actuated, or the cam is rotated, in dependence upon an engine operating characteristic such as engine speed, pressure, temperature, flight condition or other determinable parameter.

16 Claims, 3 Drawing Sheets

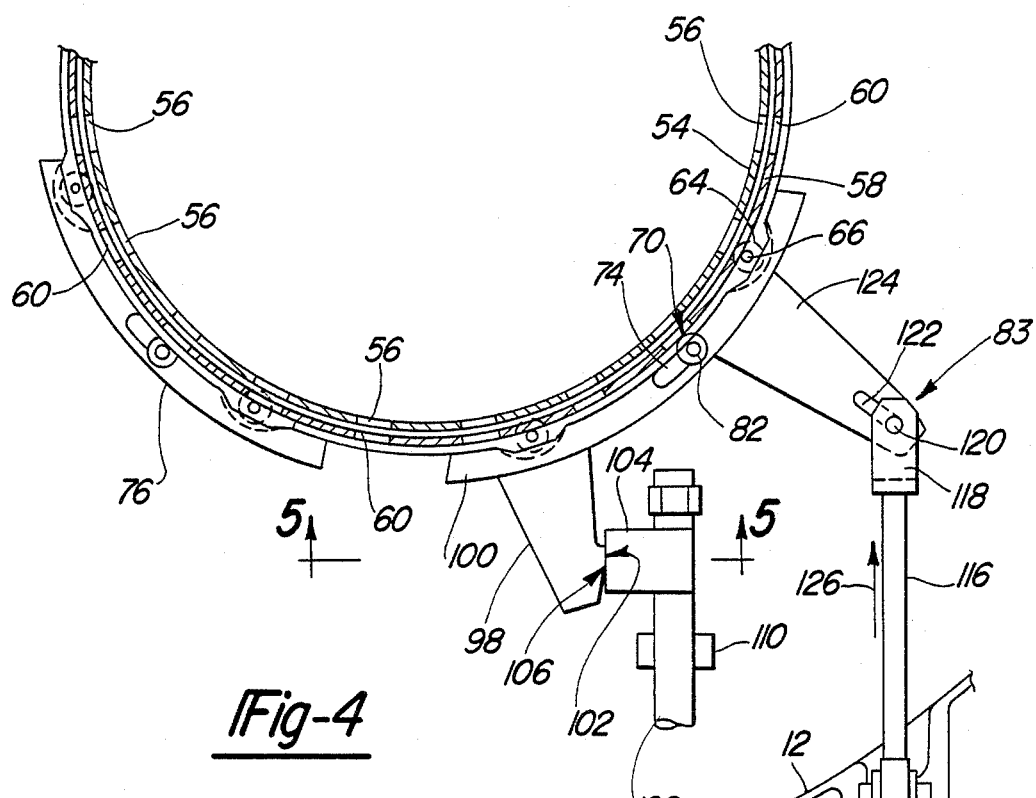
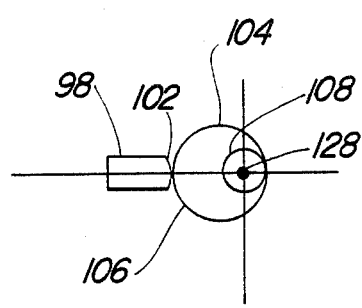

TURBINE ENGINE BLADE VARIABLE COOLING MEANS

The invention disclosed herein was first conceived during the performance of work under DOD (Navy) Contract No. N00019-80-C-0018, "Joint Technology Demonstration Engine".

BACKGROUND OF THE INVENTION

I. Field of the Invention

The present invention relates to aircraft turbine engines, and more particularly to a means for varying the cooling airflow in such engines, for example, the cooling airflow impinging on the turbine blades.

II. Description of the Prior Art

Improvements in aircraft turbine engine performance typically have been achieved by increasing the gas temperature at the inlet of the turbine rotor. Such temperatures have now been increased to the point that several current engines operate at turbine entry temperatures levels which exceed the melting points of the materials of which the turbines are composed. Therefore, means have been required for cooling these materials to sufficiently low temperatures to render them mechanically stable and otherwise within an acceptable range.

The known means for cooling the turbine component often include means for routing cooling air to the turbine components, such as to the turbine blades, in order to provide the required cooling. This cooling air is usually a portion of the intake air provided to the turbine by one of the compressor stages. The cooling air is diverted from the outlet of the compressor stage, bypassing the engine combustor, and is then allowed to pass along or through the turbine components to be cooled.

While the prior structures for providing turbine cooling air have been adequate to cool the turbine components sufficiently to permit the employment of the desired elevated combustion temperatures, such structures have generally been subject to the disadvantage that they have allowed bypass or cooling air to impinge upon the turbine components even during those circumstances when such impingement is unnecessary, for example, when the turbine entry temperatures are sufficiently low so that any cooling of the turbine components is unnecessary. Such improper impingement can be deleterious to engine performance, such as when the engine is operated at low power.

This drawback has been only partially met by prior devices for modulating the flow of the cooling air. For example, as disclosed in U.S. Pat. No. 4,416,111, some prior devices have involved the use of a pivotable valve door cooperating with part of a vaned, annular conduit (such as with the turbine nozzle) to block only a portion of the conduit, so as to reduce the cooling airflow to the turbine section of the engine. Devices of this are disadvantageous for two reasons, however. First, the flow of cooling air is merely reduced and not eliminated. Second, such devices have been relatively complex, thereby being costly to construct yet readily subject to failure in use.

SUMMARY OF THE PRESENT INVENTION

The present invention overcomes these and other drawbacks by providing a modulating apparatus providing for the complete throttling of the cooling air impinging upon one or more turbine components. The apparatus of the present invention comprises an inner annular shell fixed in location with respect to the turbine housing, and an outer annular sleeve rotatably disposed about the inner shell. Each of the shell and sleeve include a matching plurality of radial apertures. The shell and sleeve are disposed across the cooling passageway such that variable registration of the apertures in the sleeve with the apertures in the shell modulates the flow of air through the cooling passageway. The shell and sleeve together define upstream and downstream portions of the passageway, and the downstream portion of the cooling passageway is sealed from the upstream portion of the passageway when the apertures in the shell and sleeve are moved fully out of any registration with one another. Preferably, the outer sleeve is rotated with respect to the inner shell by actuation of a piston and cylinder arrangement connected to the turbine housing. The degree of linear movement of the piston in the cylinder directly determines the amount of rotation of the sleeve with respect to the shell, and the degree of registration of the radial apertures in them, thereby regulating flow through the passageway.

In another preferred embodiment of the present invention, the shell is continuously biased towards the rotational position at which the apertures in the sleeve and shell are fully out of registration with one another. The sleeve, however, includes a stop member which abuts the surface of an eccentric cam whose rotational position is varied in dependence with the operating characteristics of the engine, such as the engine speed, pressure, temperature and/or flight conditions. Since the stop is continuously biased against the cam by the means biasing the sleeve, rotation of the cam results in circumferential movement of the stop and thus of the sleeve, thereby changing the degree of registration of the apertures in the sleeve and shell. This latter embodiment has the particular advantage of eliminating the effects of differential thermal expansion between the biasing means, the support or housing, and the control linkages.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which:

FIG. 4 is a fragmentary cross-sectional view of another preferred embodiment of the present invention; and FIG. 5 is a cross-sectional view taken along line 5—5 of FIG. 4.

DETAILED DESCRIPTION OF THE PREFERRED EMBODIMENT OF THE PRESENT INVENTION

Figure 1:
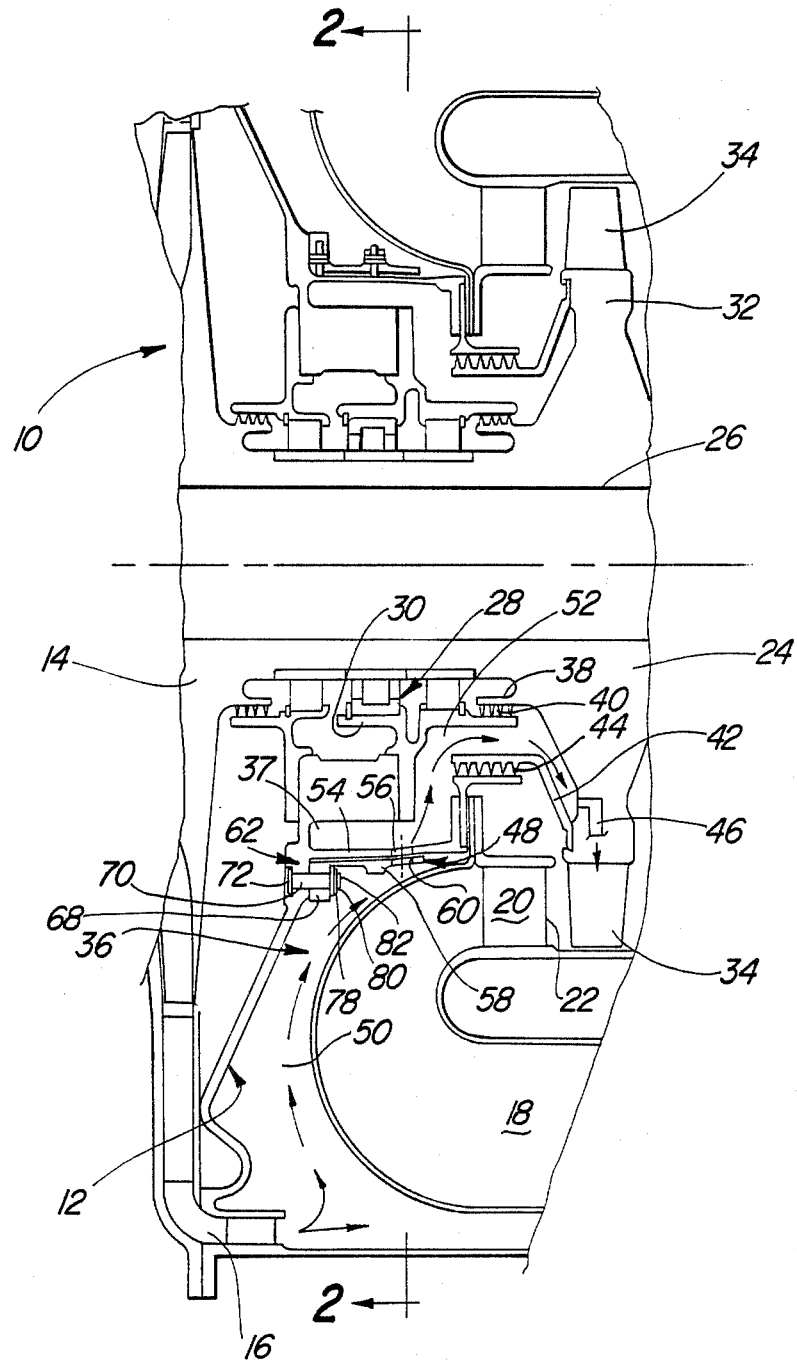
FIG. 1 is a longitudinal sectional view of the preferred embodiment of the present invention.

With reference first to FIG. 1, an engine 10 incorporating the cooling apparatus of the present invention is thereshown. The engine 10 is preferably an aircraft gas turbine engine and includes a housing 12 containing a compressor 14 therein. The engine 10 also includes a compressor outlet 16 leading from the compressor 14 and to a combustion chamber 18 also contained in the housing 12. A turbine inlet 20 is formed at the exit of the combustion chamber 18, and a plurality of stator vanes 22 are disposed in the turbine inlet 20.

The engine 10 also includes a rotor 24 rotatably mounted on a shaft 26 contained in the housing 12, connected to the housing 12 by a plurality of bearings 28 mounted to a bearing support housing 30 on the housing 12, only one of the bearings 28 being shown. The rotor 24 includes a hub 32 to which a plurality of turbine blades 34 are mounted. Preferably, the compressor 14 is mounted to the same shaft 26 as the rotor 24.

The turbine engine 10 as described so far operates in the conventional fashion. The compressor 14 provides a flow of pressurized intake air from its outlet 16, which is then fed to the combustion chamber 18, whereat the airflow is mixed with a fuel and ignited. The combustion products of the ignition of the fuel and air exit the combustion chamber 18 and pass through the turbine inlet 20 between the stator vanes 22. The exhaust gases impinge upon the turbine blades 34, inducing rotation of the rotor 24 about the shaft 26. The combustion gases then exit the engine 10 in any conventional fashion. Rotation of the shaft 26 under influence of the stream of exhaust gases through the turbine inlet 20 induces rotation of the compressor 14 so as to continuously provide a supply of air to the combustion chamber 18. The exhaust gases, of course, also serve to propel the aircraft to which the engine 10 is mounted.

A cooling passage means 36 is provided for allowing impingement of a diverted portion of the airflow from the compressor outlet 16 upon an operative portion of the engine. While such cooling air can, for example, impinge upon the bearings 28 or the wall of the combustion chamber 18, preferably the cooling passage means 36 causes specific impingement of cooling air upon the turbine blades 34. The cooling passage means 36 is defined by an annular chamber 37 formed between the housing 12 and the combustion chamber 18, in fluid communication with the compressor outlet 16. The cooling passage means 36 is also defined by a first radially inner annular flange 38 on the rotor 24 sealed with respect to the housing 12 by a first labrynth seal 40, and a second outer annular flange 42 on the rotor 24 sealed against the housing 12 by a second labrynth seal 44. A plurality of airflow outlets 46 are attached to the hub or blades in fluid communication with the passage means 36 and located so that air flowing through the outlets 46 impinges upon the turbine blades 34. This cooling air limits the amount of heat transferred to the turbine blades 34 by the combustion gases from the combustion chamber 18, thereby allowing higher combustion chamber temperatures to be employed. The cooling airflow leaves the engine 10 along with the combustion gases produced in the combustion chamber 18.

Figure 2:
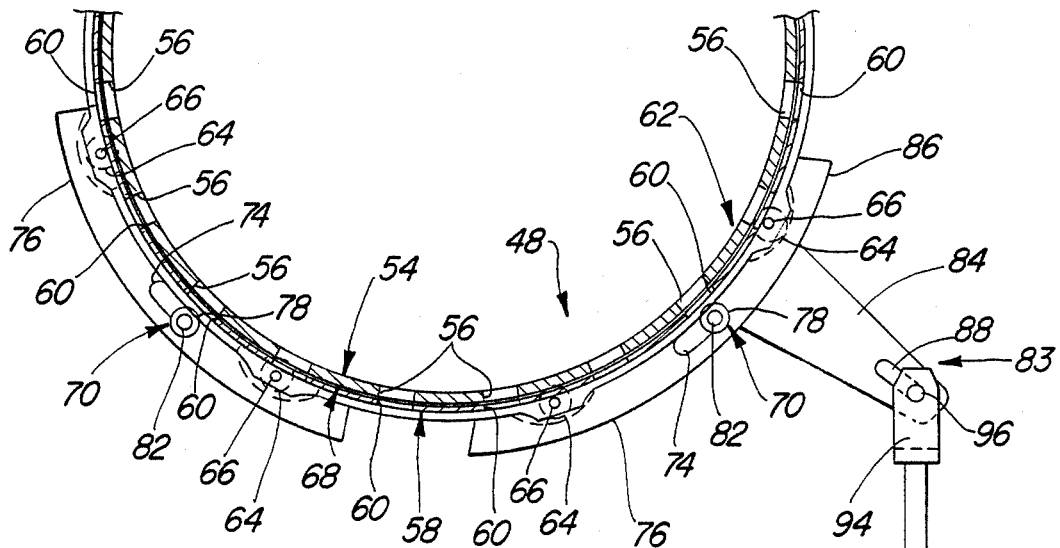
FIG. 2 is a fragmentary sectional view taken along line 2—2 of FIG. 1.
Figure 3:
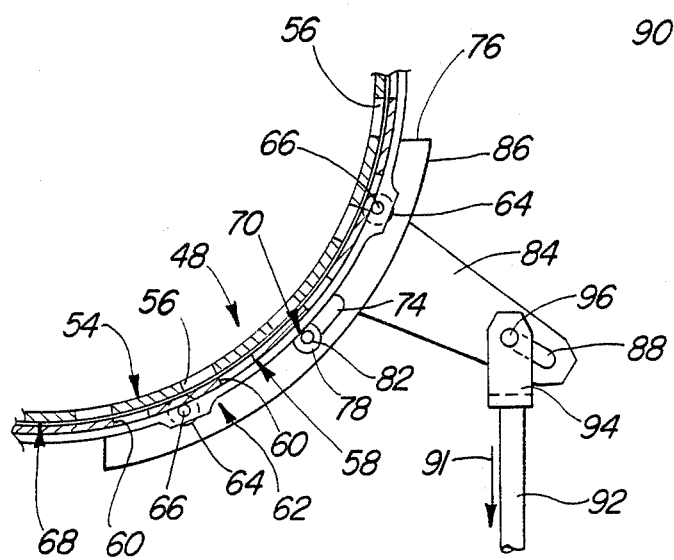
FIG. 3 is a sectional view similar to FIG. 2.

As more clearly shown in FIGS. 1 through 3, the apparatus of the present invention is used in conjunction with the engine 10 so described and comprises a means 48 disposed in the passage means 36 for variably obstructing the passage means 36, and a means 83 for actuating the obstructing means in response to an engine operating condition, such as engine speed, pressure, temperature or flight condition, or the like. The obstructing means 48 is disposed across the cooling passage means 36 and divide the cooling passage means 36 into an upstream passage portion 50 and a downstream passage portion 52. The obstruction means 48, when fully closed, substantially seals the downstream passage portion 52 from the upstream portion 50, substantially terminating cooling of the turbine blades 34.

The obstructing means 48 preferably first comprises an annular cylindrical inner shell 54 fixedly mounted in the housing 12 disposed substantially concentrically about the axis of rotation of the shaft 26 and located in the annular chamber 37. A plurality of radial shell apertures 56 are formed in the shell 54. The obstructing means 48 also comprises an annular cylindrical outer sleeve 58 disposed closely about the shell 54, similarly disposed in the annular chamber 37, but mounted to the housing 12 in such a fashion so as to be rotatable about the shell 54. The sleeve includes a matching plurality of radial sleeve apertures 60 registrable one each with one of the radial shell apertures 56. Thus, when the sleeve apertures 60 are out of registration with the radial shell apertures 56 (FIG. 3), the downstream passage portion 52 is sealed from the upstream passage portion 50, terminating the flow of cooling air against the turbine blade 34.

More particularly, the variable obstruction means 48 also comprises a means 62 for rotating the sleeve 58 with respect to the shell 54. Preferably, the rotating means 62 first comprises a plurality of rollers 64 mounted by a matching plurality of roller pins 66 to the sleeve 58, the rollers 64 abutting an outer periphery 68 of the shell 54, so that the sleeve 58 is rotatable about the shell 54. The sleeve 58 includes a plurality of radially outward extending flanges 76, which each include at least one arcuate slot 74 receiving therein a past, retainer or stop pin 70 having one end 72 mounted to the housing 12. The stop pins 70 also serve to retain the sleeve 58 on the housing 12. Each pin 70 includes a head 82, while a plurality of washers 78 and a retaining ring 80 are disposed between the sleeve 58 and the pin head 82 to retain the sleeve 58 on the pins 70.

The sleeve rotating means 58 also includes a means 83 for actuating the flow obstructing means 48. The actuating means 83 first comprises a lever arm 84 formed integrally with one flange 86 of the radial flanges 76 on the sleeve 58. The lever arm 84 has an arm slot 88 formed therein. A push-pull type cylinder 90 and piston 92 are connected to the lever arm 84 by a clevis 94 on the end of the piston 92 opposite the cylinder 90, and a clevis pin 96 passes through the clevis 94 and is slidably retained in the arm slot 88.

The cylinder 90 and piston 92 are operable in response to any conventional engine condition such as engine speed, pressure, temperature or flight condition, through electronic or computer means not shown, so as to vary the amount of registration of the shell apertures 56 and sleeve apertures 60 by linear movement of the piston 92. More specifically, linear movement of the piston 92 moves the clevis pin 96 to one end or the other of the slot 88 in the arm 84, whose abutment then moves the integrally formed lever arm 84, thereby causing the sleeve 58 to rotate about the shaft axis and about the shell 54. The stop pin 70 serves simultaneously to retain the sleeve 58 on the housing 12, and at the same time prevent overrotation of the sleeve 58 with respect to the shell 54, so that the sleeve apertures 60 are not moved beyond a point of full registration with the shell apertures 56. A position of full registration of the shell apertures 56 and the sleeve aperture 60 is shown in FIG. 2, each stop pin 70 abutting one interior end of the associated arcuate slot 74. In FIG. 3, the piston has moved outwardly of the cylinder 90 so as to move the sleeve apertures 60 out of rotation with the shell apertures 56; over rotation in this direction is stopped by abutment of the stop pins 70 with the other ends of the arcuate slots 74. Thus, the piston is moved in the direction of arrow 91 to open the flow obstructing means 48, and in the direction of arrow 93 to close the means 48. The piston 92 is variably positionable with respect to the cylinder 90, so as to provide variable obstruction of the flow passage means 36 by the obstructing means 48.

Under certain conditions, differential expansion between the housing 12, the cylinder 90 and piston 92, the sleeve 58 and the shell 54 may alter the degree of registration of the shell apertures 56 and sleeve apertures 60, particularly during changes in operating condition. In such situations, a different configuration for the means 83 for actuating the obstructing means 48 can be employed. This alternative embodiment of the means 83 is shown in FIGS. 4 and 5, and first comprises a lever arm or stop member 98 integrally formed with one flange 100 of the radial flanges 76 on the sleeve 58. The lever arm 98 includes a convex stop surface 102 which is abutable against and can ride upon the cam surface 106 of an eccentric cam 104. The cam 104 is preferably cylindrical in shape and carried on a shaft 108, the axis of the cylindricl cam 104 being offset from the axis of rotation of the shaft 108. The shaft 108 is connected to the housing 12 by a plurality of bearings 110.

The alternative construction for the actuating means 83 also comprises a means 112 for biasing the sleeve 58 towards rotation in a direction such that the stop surface 102 continually rides on the cam surface 106. The biasing means can be any convenient mechanical or hydraulic means, such as a spring or the like, but preferably comprises a continuously loaded hydraulic cylinder 114 mounted to the housing 12 and having a piston 116 extending therefrom. The piston 116 is connected to the sleeve 58 by a clevis pin 120 passing through a clevis 118 and disposed in a slot 122 formed in a second lever arm 124 integrally formed with the one flange 100, comparable to the lever arm 84. Loading of the cylinder 114 in the outward direction (arrow 126) causes the piston 116 to continuously bias the sleeve 58 towards rotation in a first direction, for example, in a counter-clockwise fashion as disclosed in FIG. 4, so as to continuously urge the stop surface 102 on the lever arm 98 against the cam surface 106 of the eccentric cam 104.

The shaft 108 is connected to a means (not shown) for rotating the shaft 108 in response to one of the engine operating parameters mentioned earlier, so that rotation of the shaft 108 presents different portions of the cam surface 106 for abutment by the stop surface 102 on the lever arm 98 affixed to the sleeve 58. As shown in FIG. 5, rotation of the cam 104 about an eccentric shaft axis 128 will result in movement of the stop surface 102 on the lever arm 98 towards or away from the shaft axis 128, when biased towards the shaft axis 128 by the cylinder 114 and piston 116. The resulting movement of the lever arm 98 causes rotation of the sleeve 58 about the shell 54, and variable registration of the sleeve apertures 60 with the shell apertures 56, yielding variable obstruction of the cooling passage means 36.

Of course, variation in the registration of the shell apertures 56 and sleeve apertures 60 can be brought about in another fashion, for example, by linear axial movement of the sleeve 58 with respect to the shell 54. Similarly, either of the shell 54 or the sleeve 58, or both of them, can be movable with respect to the housing 12, so long as the registration of their apertures is dependent upon the operating conditions of the engine, and the apertures 56 and 60 variably obstruct the cooling passage means 36. Indeed, the shell 54 and sleeve 58 need not be configured as annular cylinders, but can be any convenient shape which ensures an even distribution of the cooling air in the passage 36 about the portion of the engine 10 to be cooled.

Having described our invention, however, many modifications thereto will become apparent to those skilled in the art to which it pertains, without deviation from the spirit of the invention, as defined by the scope of the appended claims.

We claim:

1. In a turbine engine having a housing containing a compressor, a combustion chamber located downstream of said compressor, a turbine rotor positioned downstream of said combustion chamber, passage means for directing a flow of cooling air from said compressor and to the vicinity of said combustion chamber and said rotor, and means rotatably mounting said rotor in said housing so as to define a turbine axis; an apparatus for variably moderating said flow of cooling air, comprising:

means disposed in said passage means for variably obstructing said passage means; and means for actuating said obstructing means in response to an engine operating condition;

wherein said obstructing means comprises an annular shell of fixed dimension disposed about said turbine axis and having a plurality of radial shell apertures disposed in said passage means, an annular sleeve of fixed dimension disposed about said turbine axis and having a matching plurality of radial sleeve apertures disposed in said passage means, and means permitting relative movement of one of said sleeve and shell with respect to the other of said shell and sleeve so as to allow variable registration of said shell and sleeve apertures at positions between a completely closed position yielding a substantially zero rate of said flow in said passage means, and a fully open position yielding a maximal rate of said flow in said passage means.

2. The invention according to claim 1, wherein one of said shell and said sleeve is stationary with respect to said housing, and the other of said sleeve and said shell is rotatable about said turbine axis and said one of said shell and said sleeve.

3. The invention according to claim 2, wherein said actuating means comprises means for rotating said other of said sleeve and said shell about said turbine axis.

4. The invention according to claim 1, wherein said movement permitting means comprises a plurality of bearings mounting said one of said sleeve and said shell to said housing.

5. The invention according to claim 1, wherein each of said shell and said sleeve extend axially and are generally configured as hollow cylinders.

6. The invention according to claim 1, wherein said shell is fixed to said housing, and said sleeve is disposed closely about and rotatable about said shell.

7. The invention according to claim 4, wherein said bearings comprise rollers mounted to said one of said sleeve and said shell, disposed circumferentially about said housing.

8. The invention according to claim 2, wherein said obstructing means divides said passage means into an upstream portion and a downstream portion, and is adapted to substantially seal said downstream portion from said upstream portion when actuated by said actuating means.

9. The invention according to claim 2, wherein said obstructing means divides said passage means into an upstream portion and a downstream portion, and substantially seals said downstream portion from said upstream portion when said shell apertures and sleeve apertures are out of registration.

10. The invention according to claim 1, wherein said rotor includes an axial hub, a plurality of turbine blades, and a spaced pair of axially extending flanges on said hub, together defining a part of said passage means therebetween; and seal means disposed between each of said annular flanges and said housing; said passage means discharging said cooling airflow onto said blades.

11. The invention according to claim 1, wherein said apparatus further comprises an arcuate opening formed in said one of said sleeve and said shell, and a post fixed to said housing and disposed in said opening.

12. The invention according to claim 1, wherein said actuating means comprises a hydraulic cylinder and piston connecting said housing and said one of said sleeve and said shell.

13. The invention according to claim 1, wherein said actuating means comprises a stop on said one of said sleeve and said shell, an abutment surface connected to said housing, and means biasing said stop against said abutment surface.

14. The invention according to claim 13, wherein said actuatng means comprises a cam on which said abutment surface is formed.

15. The invention according to claim 14, wherein said actuating means comprises means for rotating said cam with respect to said housing.

16. The invention according to claim 15, wherein said cam is an eccentrically rotated cylinder.

* * * * *